Sept. 9, 1958 D. F. SE LEGUE ET AL 2,850,896
AIRSTREAM DIRECTION DETECTOR
Filed Nov. 29, 1954
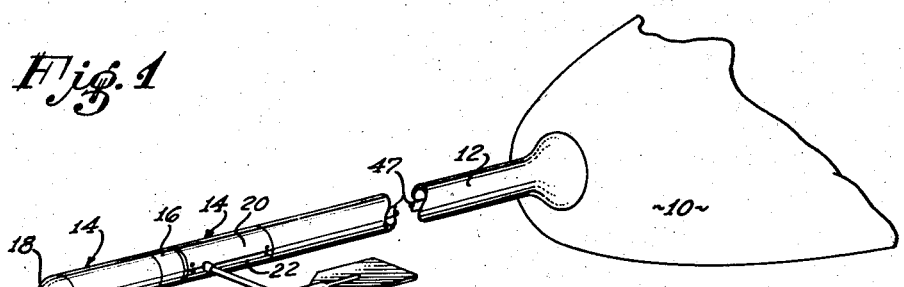
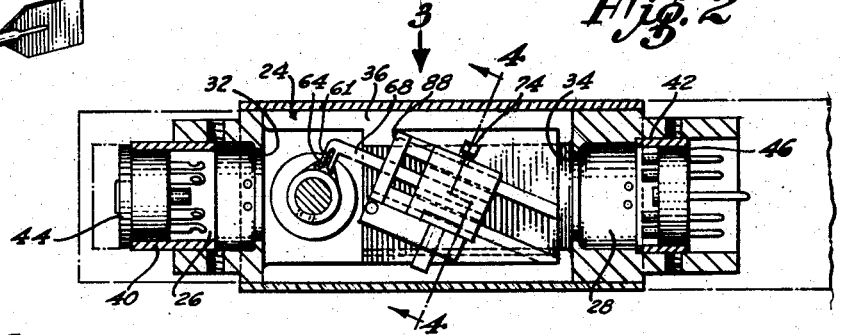
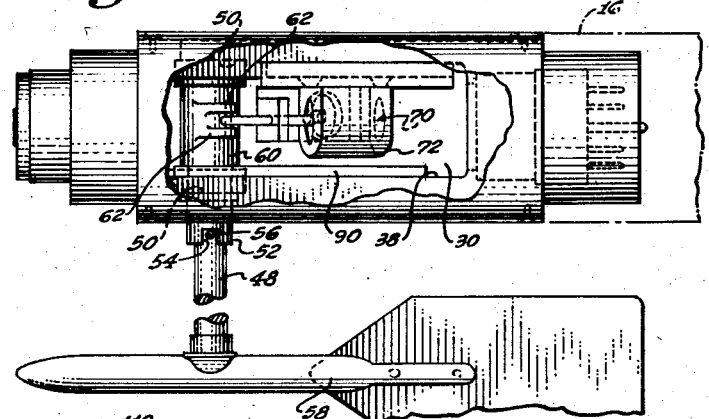
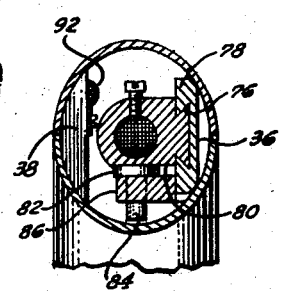
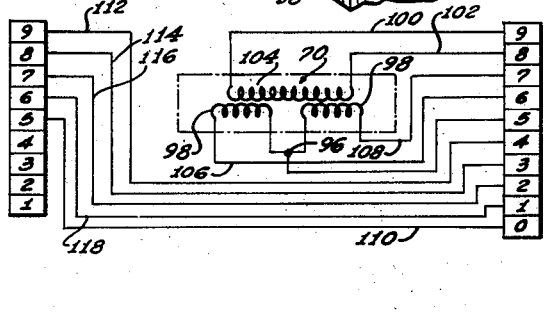
INVENTORS:-
David F. SeLegue
Stanley Ziegler
By Herbert E. Metcalf
Their Patent Attorneys

United States Patent Office 2,850,896
Patented Sept. 9, 1958

2,850,896

AIRSTREAM DIRECTION DETECTOR

David F. Se Legue, San Gabriel, and Stanley Ziegler, Northridge, Calif., assignors to Northrop Aircraft, Inc., Hawthorne, Calif., a corporation of California Application November 29, 1954, Serial No. 471,857

6 Claims. (Cl. 73—188)

This invention has to do with a transducer assembly and more particularly with a sensitive airstream direction detector that may be incorporated into aircraft.

While testing the flight of aircraft it is often necessary and convenient to know the amount of pitch and yaw that is imposed thereon by the airstream flowing thereabout.

Therefore, the principal object of this invention is to provide a sensitive airstream direction detector that will, through the medium of electrical signals, register on an instrument the amount of pitch or yaw or both that is imposed on an aircraft, by the flow of the airstream thereabout.

Another object of this invention is to provide a sensitive airstream direction detector that, through the medium of electrical signals, will register on an instrument the amount of pitch or yaw or both that is imposed, on an aircraft, is easily adjusted and calibrated in order that substantially infallible readings may be obtained.

A yet further object of this invention is to provide a sensitive airstream direction detector that is compact in size, economical to manufacture, and readily constructed.

Figure 1 is a fragmentary, perspective view illustrating the invention embodied herein installed on a boom attached to the nose of an aircraft.

Figure 2 is a longitudinal, cross-sectional view of the invention, certain parts being shown in dotted lines for purposes of clarity.

Figure 3 is a fragmentary top view as determined by looking in the direction of the arrow found in Figure 2 and identified by 3.

Figure 4 is a transverse, cross-sectioned view taken on irregular lines 4—4 in Figure 2 looking in the direction indicated.

Figure 5 is a wiring diagram illustrating the circuit for transmitting signals to an instrument located in an aircraft and incorporating a pair of coupled together airstream direction detectors.

Referring to the drawings 10 designates the nose of an aircraft having a boom 12 removably attached thereto. On the free end of the boom 12 and plugged therein are a pair of identical airstream direction detector units both of which are broadly designated by 14. However, as the two units are illustrated, one is for determining the yaw that may be imposed on an aircraft by the airstream flowing thereabout and the other is for ascertaining the pitch. The two are coupled together by a hollow cylinder sleeve 16. The unit 14 most forward on the boom 12 has a semi-spherical cap 18 attached thereto for the purpose of protection. Certain of the operational parts of the airstream direction detector are enclosed within a cylindrical case divided into a pair of half sections, 20 and 22 for the purpose of making the structure contained within in easy access.

Partially enclosed within the two sections 20 and 22 is an elongated body 24 having a pair of spaced apart chambers 26 and 28 therein each of which have an opening therefrom, in communication with an elongated compartment 30, defined by annular shoulder 32 and 34. The compartment 30 has a pair of spaced apart walls 36 and 38.

Secured within each chamber 26 and 28 by collar 40 and 42 is a keyed wire prong socket 44 and plug 46 respectively. Socket 44 is adapted to receive plug 46 when two units 14 are coupled together, and due to the fact that the two are keyed they can be assembled in only one way which would result in the assembly illustrated in Figure 1 of the drawings. The prongs of the plug 46 are adapted to be plugged into the free end of the boom 12 or the cable 47 located therein.

Disposed in compartment 30, adjacent chamber 26 and extending outwardly through an opening in the sections 20 and 22 is a shaft 48 supported in ball bearings 50 mounted in the walls 36 and 38. Intermediate the ends of the shaft 48, partially mounted in wall 36 is a collar-like sleeve 52, which has a notch 54 formed therein to receive a screw 56 threaded into shaft 48. The screw 56 and notch 54 limit the rotation of shaft 48.

Secured to the free end of the shaft 48 is a vane 58 which is acted upon by the airstream flowing thereabout to rotate shaft 48. The vane illustrated does not necessarily represent the true configuration of the same but is merely illustrative of the fact that a vane is attached to the shaft. A vane of any configuration may be used and the one shown is for purposes of illustration only.

Disposed on shaft 48 between bearings 50, and rotatable therewith is a crank 60 having a pair of spaced apart ears 62 projecting therefrom through which extends a pin 64 rigidly held therein.

Secured to pin 64 between ears 62 by a pin embracing notch 61 is an L-shaped nylon arm 68. Arm 68 has secured thereto in opposed relationship to said notch an iron core of a transformer 70.

The transformer 70 is retained in holder 72 by a set screw 74. The holder is slidable and adjustable in V-shaped groove formed in plate 78 and is retained in a calibrated position by any suitable means such as a screw or the like. Plate 78 is secured to wall 36.

The holder 72 has a notch 80 therein which receives a circular disc cam 82 having a projection 84 thereon which extends through a hole formed in plate 86. Secured to plate 86 is another plate 88 which has an opening therein to receive arm 68 for the purpose of guiding the latter into and out of the transformer 70.

Secured to wall 38 is a wire shield 90 that has an arcuately bent edge 92 thereon into and through which wires extending from socket 44 pass to be connected to poles of plug 46.

In order that accurate readings may be obtained on the instrument enclosed in the aircraft the airstream direction detector must be calibrated in the following manner. The shaft 48 is locked with the screw 56 midway between the walls of the notch 54.

The arm 68 is also locked in place. The holder 72 is adjusted on plate 78 by cam 82 until a zero reading 96 is obtained from the secondary coils 98 of the transformer.

Assuming the unit 14 to be calibrated in the above manner and properly installed in an aircraft for the purpose of determining pitch. The operation is then as follows: electrical energy from a source in the aircraft is conducted through and from leads 100 and 102 respectively to energize primary coil 104. Air flowing about vane 58 will cause the same to rotate shaft 48 which in turn will impose a rotating motion on crank 60 resulting in moving L-shaped arm 68 and the iron core thereon into or out of the transformer 70. As a result the output electrical energy from secondary coils 98 will vary. If the airstream causes the aircraft to pitch up which action will in turn affect the vane 58 then a greater electrical signal will be transmitted from one secondary coil 98 through lead 106 to register on a properly calibrated instrument to indicate the amount of said pitch. If the airstream causes the aircraft to pitch down then the core would influence the other secondary coil to a greater extent and an increased electrical signal would be conducted through lead 108 to the instrument.

Assuming there to be a pair of units 14 coupled together in the manner illustrated in Figure 1 of the drawings and two indicator instruments installed in the aircraft. The aforementioned operative description would continue to apply to one and the following would apply to the other. Again a zero reading must be calibrated which is indicated by lead 110. The positive and negative leads for the primary coil are designated 112 and 114. If the airstream causes a yaw to the left then an increased electrical output is conducted through lead 116. If a yaw is to the right, then an increased electrical output is transmitted through lead 118.

It is to be understood that it is not necessary to couple the units in the manner indicated in Figure 1 of the drawings. In other words the unit for determining yaw which is the one directly connected to the boom may be placed in front of the unit for determining pitch. Further if two units are interconnected the leads from the forwardmost unit is connected to the poles of the unit plugged into the boom. However, it is to be understood that if desired only one unit 14 may be used.

While in order to comply with the statute, the invention has been described in language more or less specific as to structural features, it is to be understood that the invention is not limited to the specific features, shown, but that the means and construction herein disclosed comprise a preferred form of putting the invention into effect, and the invention is therefore claimed in any of its forms or modifications within the legitimate and valid scope of the appended claims.

What is claimed is:

1. A sensitive airstream direction detector comprising a case plug connected to an electrical cable in an aircraft boom; an electrically energized transformer within the case for transmitting a signal to an instrument in the aircraft; said transformer having an adjustable iron core slidable therewithin; a rotatable shaft extending into and from the case; a vane on the shaft exterior of the case for transmitting the direction of airstream flow to the transformer; and means interconnected to said shaft in opposed relationship to said vane for altering the condition of the iron core with respect to the transformer.

2. A sensitive airstream direction detector comprising: a case plug connected to an electrical cable in an aircraft boom; an electrically energized transformer within the case for transmitting a signal to an instrument in the aircraft; said transformer having an adjustable iron core slidable therewithin; a rotatable shaft extending into and from the case; a vane on the shaft exterior of the case for transmitting the direction of airstream flow to the transformer; and means interconnected to said shaft in opposed relationship to said vane for altering the condition of the iron core with respect to the transformer; said means including an arm.

3. A sensitive airstream direction detector comprising a case plug connected to an electrical cable in an aircraft boom; an electrically energized transformer within the case for transmitting a signal to an instrument in the aircraft; said transformer having an adjustable iron core slidable therewithin; a rotatable shaft extending into and from the case; a vane on the shaft exterior of the case for transmitting the direction of airstream flow to the transformer; and means interconnected to said shaft in opposed relationship to said vane for altering the condition of the iron core with respect to the transformer; and structure on the shaft for limiting the rotation thereof.

4. A sensitive airstream direction detector comprising a case to be mounted on and at the end of an aircraft boom; a plug in the case that mates with a complementary plug on an electric cable extending the length of the aircraft boom; an electrically energized transformer connected to said plug and within the case for transmitting a signal to an instrument in the aircraft; said transformer having an adjustable iron core slidable therewithin; a rotatable shaft extending into and from the case; a vane on the shaft exterior of the housing for transmitting the direction of airstream flow to the transformer; and means interconnected to said shaft in opposed relationship to said vane for altering the condition of the iron core with respect to the transformer.

5. A sensitive airstream direction detector comprising a case to be mounted on and at the end of an aircraft boom; a plug in the case that mates with a complementary plug on an electric cable extending the length of the aircraft boom; an electrically energized transformer connected to said plug and within the case for transmitting a signal to an instrument in the aircraft; said transformer having an adjustable iron core slidable therewithin; a rotatable shaft extending into and from the case; a vane on the shaft exterior of the case for transmitting the direction of airstream flow to the transformer; and means interconnected to said shaft in opposed relationship to said vane for altering the condition of the iron core with respect to the transformer; said means including an arm.

6. A sensitive airstream direction detector comprising a case to be mounted on and at the end of an aircraft boom; a plug in the case that mates with a complementary plug on an electric cable extending the length of the aircraft boom; an electrically energized transformer connected to said plug and within the case for transmitting a signal to an instrument in the aircraft; said transformer having an adjustable iron core slidable therewithin; a rotatable shaft extending into and from the case; a vane on the shaft exterior of the case for transmitting the direction of airstream flow to the transformer; means interconnected to said shaft in opposed relationship to said vane for altering the condition of the iron core with respect to the transformer; and structure on the shaft for limiting the rotation thereof.

References Cited in the file of this patent

UNITED STATES PATENTS

| Number | Name | Date |
|---|---|---|
| 1,332,810 | Danielson | Mar. 2, 1920 |
| 2,457,751 | Thompson | Dec. 28, 1948 |
| 2,467,179 | Andresen | Apr. 12, 1949 |
| 2,524,747 | Ayres | Oct. 10, 1950 |
| 2,579,902 | Carbunara | Dec. 25, 1951 |
| 2,603,422 | Sargeaunt | July 15, 1952 |
| 2,662,402 | Ince | Dec. 15, 1953 |